United States Patent
Hopkins, III

(10) Patent No.: US 8,346,657 B1
(45) Date of Patent: Jan. 1, 2013

(54) SYSTEMS AND METHODS FOR IMPLEMENTING A REVERSE MORTGAGE

(75) Inventor: John Chandler Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/923,703

(22) Filed: Oct. 25, 2007

(51) Int. Cl.
*G06Q 40/00* (2012.01)

(52) U.S. Cl. .......................................... 705/38; 705/40

(58) Field of Classification Search .................... 705/38, 705/39, 40, 7.11–7.42
See application file for complete search history.

(56) References Cited

U.S. PATENT DOCUMENTS

| | | | | |
|---|---|---|---|---|
| 5,991,745 | A | | 11/1999 | Kiritz |
| 6,012,047 | A | * | 1/2000 | Mazonas et al. ................ 705/38 |
| 7,024,384 | B2 | | 4/2006 | Daughery, III ............ 705/36 R |
| 7,089,503 | B1 | * | 8/2006 | Bloomquist et al. .......... 715/780 |
| 7,111,845 | B2 | | 9/2006 | Walker ......................... 273/292 |
| 7,127,406 | B2 | | 10/2006 | Triola ............................. 705/1 |
| 7,150,015 | B2 | | 12/2006 | Pace .............................. 717/176 |
| 7,246,244 | B2 | | 7/2007 | Nanavati ...................... 713/186 |
| 7,249,077 | B2 | | 7/2007 | Williams ....................... 705/35 |
| 7,974,917 | B2 | * | 7/2011 | Wagner ......................... 705/38 |
| 2002/0055905 | A1 | * | 5/2002 | Jannah et al. .................. 705/38 |
| 2003/0154161 | A1 | | 8/2003 | Stahl et al. |
| 2005/0177508 | A1 | * | 8/2005 | Pembroke ....................... 705/40 |
| 2007/0288361 | A1 | * | 12/2007 | Martignoni .................... 705/38 |
| 2008/0120226 | A1 | | 5/2008 | Wegmann et al. |
| 2009/0106142 | A1 | * | 4/2009 | Lange et al. .................... 705/38 |

OTHER PUBLICATIONS

Lenders et al., "GSES East Mortgage Forbearance for Military." Mortgage Banking, 2003, 63(9), p. 14.*
Business Editors, "Lenders, Fanni Mae Ease Mortgage Forbearance Process for Military Personnel," Business Wire, May 7, 2003, p. 1-2.*
Decker, J., "When reservists are called to active duty, nearly a third of their families see a decrease in income. How one such family makes ends meet." The Christian Science Monitor, http://www.csmonitor.com/2004/0614/p14s02-wmgn.html, Jun. 14, 2004.
"Get the Math Right on Bank Mortgages," The Spectator, Hamilton, Ont., Apr. 4, 2000, p. B.02 (1-2).
"Reverse Mortgage of Texas FAQs," Reverse Mortgage of Texas, 2005, p. 1-12.
USA Today Article, "Financial Rights for Active Personnel," FindArticles.com, 2004, p. 1-2.
Arrowood, J., "Financial Planning for Military Families," AdvisorToday.com, 2008, p. 1-2.
SLCS Webpage, "Forbearance," Student Loan Counseling Service, Inc., 2001, p. 1-2.
Lamoreaux, S., "Using a Reverse Mortgage," downloaded Oct. 20, 2008, p. 1-15.

(Continued)

*Primary Examiner* — Thomas Dixon
*Assistant Examiner* — Benjamin S Fields
(74) *Attorney, Agent, or Firm* — Brooks, Cameron & Huebsch, PLLC

(57) ABSTRACT

A method, system and computer-readable medium for providing a reverse mortgage instrument for use in an existing mortgage are disclosed. In certain circumstances, a reverse mortgage is beneficial to military personnel being deployed, or other customers experiencing financial hardship. The present reverse mortgage allows a customer to either apply for the reverse mortgage, or pre-designate the mortgage to have a reversal upon the occurrence of a predetermined event.

21 Claims, 5 Drawing Sheets

OTHER PUBLICATIONS

Campus Partners Forbearance Request Form. May 29, 2006. http://web.archive.org/web/20060529221449/http://www.campuspartners.com/documents/ForbRequestSelfInsured.pdf.

Jaffer, Mevish. The Scoop on Mortgage Forbearance. Personal Home Loan Mortgages Website. Jul. 4, 2007. http://web.archive.org/web/20070704201246/http://www.personalhomeloanmortgages.com/articles_home_forbearance.asp.

Downes, John et al. The Dictionary of Finance and Investment Terms. 1998. Fifth Edition. pp. 496.

Fannie May Announcement on Military Indulgence. May 7, 2003. https://www.efanniemae.com/sf/guides/ssg/annltrs/pdf/2003/03-05.pdf.

* cited by examiner

Particulars:

*Home:*

| Purchased Price: | $160,000.00 |
|---|---|
| Current Value | $170,000.00 |
| Mortgage: | $80,000.00 | ← 210
| Rate: | 6.90% | ← 220

*Monthly Mortgage Payment:*

| Principal & Interest | $526.88 | ← 240 |
|---|---|---|
| Property Tax Escrow | $350.00 | ← 250 |
| Insurance Escrow | $92.00 | ← 260 |
| Total Mortgage | | $968.88 | ← 230

Deployment Notification Reversal

Home Equity Loan originated

*Terms:*

| Duration: | 5 Years |
|---|---|
| Loan Amount: | $36,000.00 |
| Monthly Disbursement: | $600.00 |

Monthly Mortgage Payment:

| Principal & Interest | Suspended | |
|---|---|---|
| Property Tax Escrow | 350.00 | |
| Insurance Escrow | 92.00 | |
| Monthly Disbursement: | $600.00 | |
| Monthly Total after Escrow: | | $158.00 | ← 270

Deployment Notification Reversal Terminated

| Home Equity Loan | | |
|---|---|---|
| Total Monthly | 24 | |
| Total Dollars Disbursed | $14,400.00 | |
| Original Loan Payoff | $80,000.00 | |
| Closing costs | $1,800 | |
| New Rate: | 5.90% | |
| New Loan Amount | | $96,200.00 |

New Monthly Mortgage Payment:

| Principal & Interest | $570.60 | |
|---|---|---|
| Property Tax Escrow | $350.00 | |
| Insurance Escrow | $92.00 | |
| Total Mortgage | | $1,012.60 |

FIG. 2

SYSTEMS AND METHODS FOR IMPLEMENTING A REVERSE MORTGAGE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007.

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 11/923,721, U.S. patent application Ser. No. 11/923,728, U.S. patent application Ser. No. 11/923,736, and U.S. patent application Ser. No. 11/923,746, each filed on Oct. 25, 2007 and each entitled "SYSTEMS AND METHODS FOR IMPLEMENTING A REVERSE MORTGAGE."

FIELD OF THE INVENTION

This disclosure, generally, relates to financial instruments. More specifically, the disclosure relates to systems and methods for implementing a reverse mortgage.

BACKGROUND OF THE INVENTION

Reverse annuity mortgages, more commonly known as "reverse mortgages" allow homeowners to use the equity in their home to supplement their monthly income. They are gaining popularity as with senior citizens as a method to provide a monthly income to supplement their fixed income and meet monthly expenses. A reverse mortgage financial instrument allows the homeowner to retain home ownership while receiving tax-free income each month. Reverse mortgages doe not have to be repaid until the borrower moves, sells, refinances the property or dies. If the property is sold, any remaining proceeds after the mortgage is paid off are distributed to the homeowner or next of kin.

Reversible mortgages have not been widely used outside of the senior citizen demographic. It would therefore be advantageous to provide a reverse mortgage instrument that appeals to other segments of potential homeowners. It is thus to such a reverse mortgage instrument that the present disclosure is primarily directed.

SUMMARY OF THE INVENTION

The present invention is a reverse mortgage instrument that allows modification of an existing mortgage per predetermined circumstances. In one embodiment, the reverse mortgage is advantageous for a deployed military service member home owner with positive equity. It may be used to insure that deployed active duty military service members do not lose financial ground or suffer financial difficulties while deployed, either abroad in hostile military engagements or during other tours of duty.

Another group of potential homeowners that would stand to benefit through the use of the present reverse mortgage instrument is homeowners experiencing financial hardships. A reverse mortgage instrument geared towards this group of individuals is also disclosed.

BRIEF DESCRIPTION OF THE DRAWINGS

FIG. 2 is an example of one embodiment of the financials related to the reverse mortgage.

DETAILED DESCRIPTION OF THE ILLUSTRATIVE EMBODIMENTS

The instant invention is a deployment mortgage reversal option (hereinafter, "DMRO") that is executable at the time of deployment or at any time while deployed, for the duration of the deployment. Upon execution of the DMRO, the payment stream is reversed. Instead of the borrower making monthly payments to a lender, as with a regular mortgage, the lender makes payments to the borrower.

Figure 1:
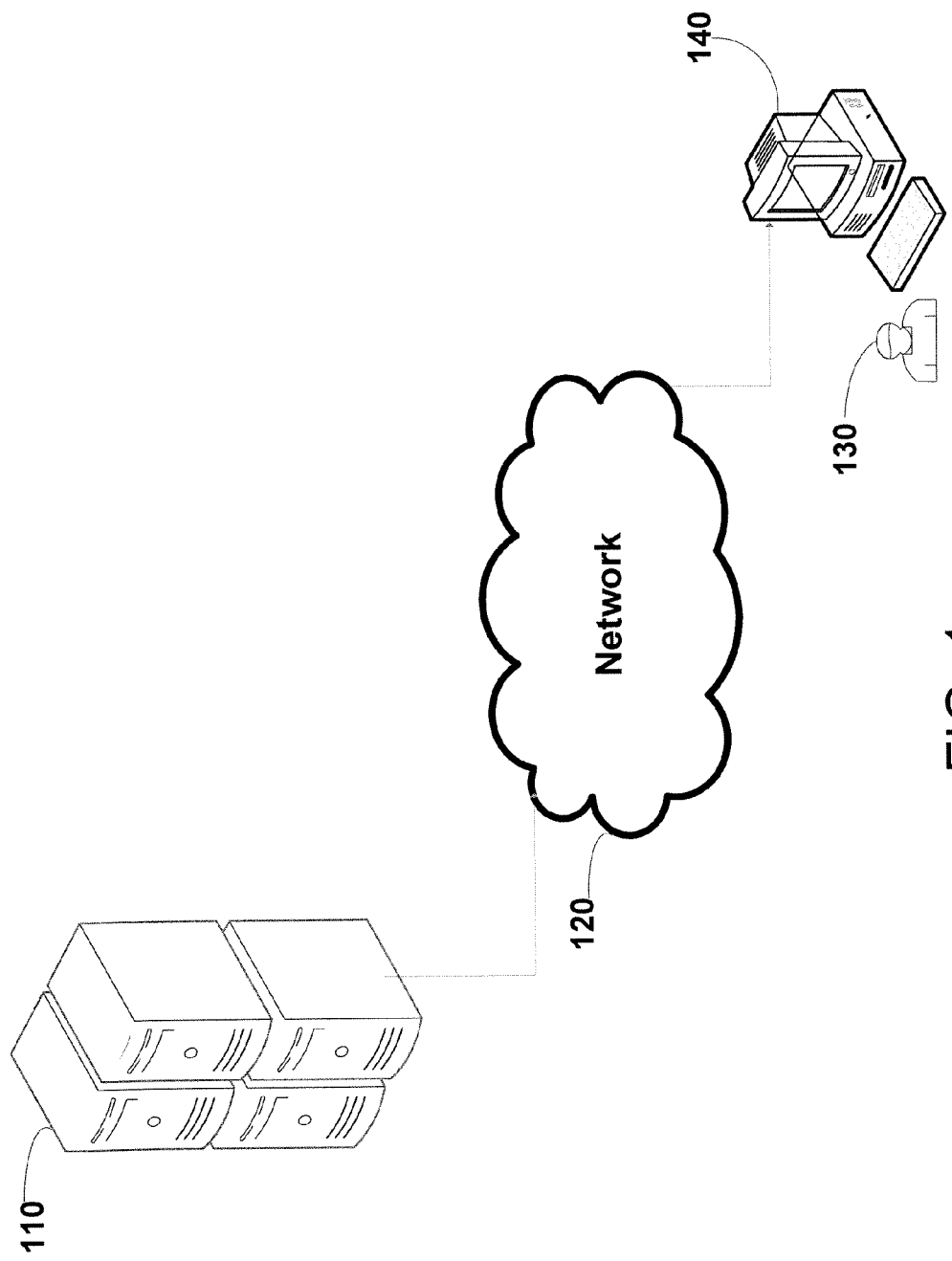
FIG. 1 is a graphical representation of a customer using a personal computer to connect to the financial institution to access the portfolio planner.

FIG. 1 illustrates a customer completing an application for a reversible mortgage. In FIG. 1, the customer 130 completes an application for the reversible mortgage using his personal computer 140, either at home or at work that is connected to a network 120. The network is connected to the financial institution's network server 110. The customer commonly accesses the financial institution's network server through the Internet. The customer may also complete the application at a banking branch, on-line, using his personal data assistant (PDA), using a telephone or a cellular phone, or using a text message.

In a first embodiment, illustrated by FIG. 2, the military service member and his family's monthly income will be increased by the amount of the monthly mortgage payment plus a monthly amount of a percentage of the equity in the home minus the monthly amount of escrow payments (i.e., for property tax and homeowners insurance). An example of the income stream available to a married couple that is using the DMRO follows. A married couple owns a home mortgaged though a financial institution providing the reversible mortgage option to military service members. The husband is actively employed with the United States military and his wife is a stay-at-home mom. The mortgage on their home is for eighty-thousand dollars ($80,000) 210 at a 6.9% interest rate 220. They have ninety-thousand ($90,000) in equity. Their monthly mortgage payment 230 is $968.88, which breaks down to: $526.88 for principal and interest 240; $350.00 for property tax escrow funding 250; and $92 for insurance escrow funding 260. Upon notification of deployment, the husband activates the mortgage reversal option to make ends meet while deployed. The reversal immediately suspends payment of principal and interest payments 240, sets up payment of the $442 monthly escrow fund (250,260), and deposits $158 monthly in the couple's checking account to cover shortfalls 270. Ultimately the family's income increases by $1126.88 a month ($968.88 mortgage payment 230 they did not have to pay plus the $158 monthly deposit to checking during the husband's deployment 270.

A DMRO for a military service member may be implemented in one of two ways. Before being deployed, either to a tour of duty in a war zone or to a tour of duty to a non-war zone, the military service member may complete an application either in-person at a financial institution banking branch, on-line, using a telephone or a cellular phone, or using a text message. During the application process, the military service member may indicate that if deployed his mortgage should be converted automatically to a DMRO so that his family will have the extra income while he is away. Once the military service member is deployed the DMRO will begin upon notification from the military service member or upon notification from a government entity, such as the Department of Defense that the military service member has been deployed to a war zone. The DMRO terminates at the end of the deployment or if the military service member cancels the DMRO In an alternative embodiment, the military service member can take more of a wait-and-see approach to determine whether his family will actually need the extra income provided by a DMRO. If the military service member determines that his family is struggling financial while he is away, he may then apply for the DMRO. The military service member may complete an application either in-person at a financial institution banking branch, on-line, using a PDA, using a telephone or a cellular phone, or using a text message. His monthly mortgage payment will then stop and his family will have an additional amount of income to their disposal because the monthly mortgage payment has been suspended plus they are receiving a predetermined monthly amount of a percentage of the equity in the home minus the amount of monthly escrow payments. The DMRO terminates at the end of the deployment of military service member or if the military service member cancels the DMRO.

If a military service member has completed an application for a DMRO several years before being deployed and has obtained a significant amount of equity in his home not clearly reflected in his initial home appraisal or if his credit situation has changed significantly, i.e., he has gotten into an extreme amount of debt or experienced other economic hardships, it may be necessary to adjust the amount of equity that the customer can access using the DMRO. To reflect all of these occurrences and to determine the appropriate amount of equity subject to the DMRO, it may be necessary to get a new appraisal on the home subject to the DMRO or to pull a new credit report in order to access the military service member's financial situation. The amount of equity subject to the DMRO may be increased or decreased accordingly. In some instances the amount of money subject to the reverse mortgage may exceed the amount of equity in the home.

In addition to getting a DMRO when the military service member is deployed, the military service member may convert his mortgage to a reverse mortgage during a financial hardship. When the military service member begins to experience the financial hardship, he may complete an application for a reverse mortgage. In this embodiment, the military service member may use the reverse mortgage to assist with medical bills not covered by his military benefits (i.e. for his spouse, his children, or maybe his parents), to supplement his income if his spouse loses their job, or for other emergency situations. The financial institution offering the reverse mortgage will determine the length the reverse mortgage period depending on the type of emergency situation, his debt, credit score, etc. The reverse mortgage will terminate at the end of that predetermined amount of time or if it is cancelled by the customer prior to its automatic termination.

There are different ways in which the reverse mortgage may work. In one embodiment, the military service member may continue to accrue additional interest on his loan amount. In a second embodiment, the interest accrual may be suspended during the reverse mortgage pay-out period as a convenience to the service member.

In an alternative embodiment, the reverse mortgage will be available to customers of a financial institution who are not military service members, but who are experiencing financial hardships or difficulties. The customer may submit an application for a reverse mortgage in advance, but may allow it to remain dormant until it is needed. If the customer completed an application for a reverse mortgage several years before the financial hardship began and has obtained a significant amount of equity in his home not clearly reflected in his initial home appraisal or if his credit situation has changed significantly, i.e., he has gotten into an extreme amount of debt or experienced other economic hardships, it may be necessary to adjust the amount of equity that the customer can access using the reverse mortgage. To reflect all of these occurrences and to determine the appropriate amount of equity subject to the reverse mortgage, it may be necessary to get a new appraisal on the home subject to the reverse mortgage or to pull a new credit report in order to access the customer's financial situation. The amount of equity subject to the reverse mortgage may be increased or decreased accordingly. In some instances, the amount of money subject to the reverse mortgage may exceed the amount of equity in the home. If, and when, a financial hardship occurs [i.e., medical bills, the spouse loses their job, or another emergency situation] the customer may implement or to initiate the reverse mortgage by informing the financial institution that he is experiencing a financial hardship by going to one of the banking branches, by going on-line, using his PDA, via telephone or cellular phone, or via text message in order to initiate the reverse mortgage. The financial institution offering the reverse mortgage will determine the length the reverse mortgage period depending on the emergency situation, his debt, credit score, etc. The reverse mortgage will terminate at the end of that predetermined amount of time.

In another embodiment, the customer may apply for a reverse mortgage when he begins to experience financial difficulties. He may do so by completing an application at one of the financial institution's banking branches, on-line, using a PDA, via telephone or cellular phone, or via text message. The reverse mortgage will be activated and implemented shortly thereafter. The interest accrual on the initial loan amount may be suspended depending on the credit history of the customer. Alternatively, the interest may continue to accrue. The reverse mortgage will terminate at the end of a predetermined amount of time or if cancelled before.

In an alternative embodiment, the customer may implement a reverse mortgage as described in the embodiments above. However, the customer may have the reverse mortgage refinanced automatically at the termination of a predetermined event. A predetermined event may be the end of a deployment, if the customer is a military service member, or at the end of a predetermined amount of time, if the reverse mortgage is obtained by a customer experiencing a financial hardship. The reverse mortgage actually suspends the original or first home loan, creates a home equity loan where proceeds are dispersed on a monthly basis, and pays monthly escrow amounts. When the reverse mortgage is refinanced, the original or first home loan is paid off, the home equity loan is paid off, and then both the first home loan amount and the home equity loan amount are wrapped into a new or second loan amount. The loan is refinanced at an interest rate lower than the previous interest rate, if possible, i.e. the interest rate on the day that the reverse mortgage began or the interest rate on the day that the reverse mortgage terminates or is cancelled.

Figure 3:
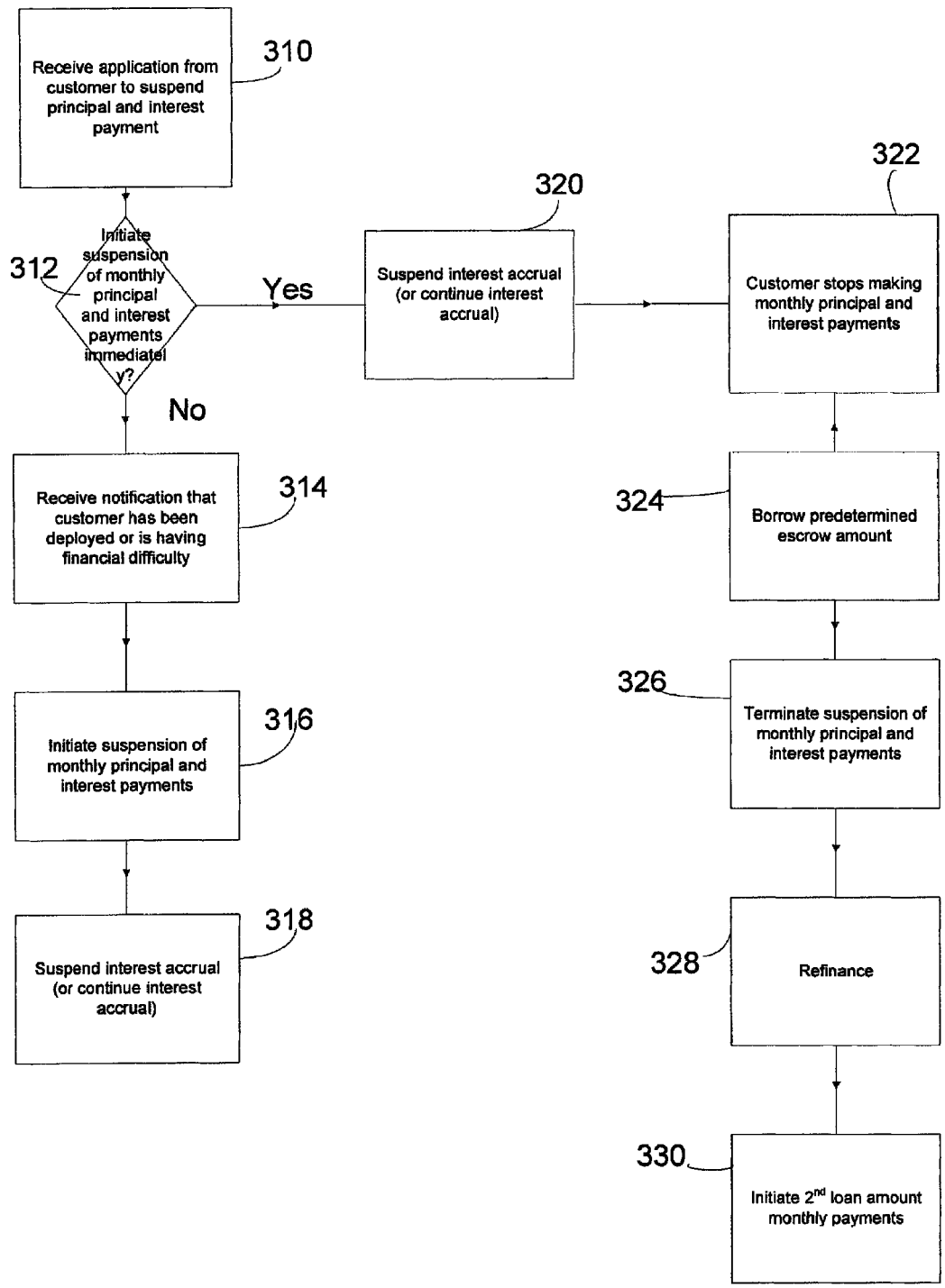
FIG. 3 is a flow diagram illustrating a method of refinancing a loan that has had monthly principal and interest payments suspended.

In another embodiment shown in FIG. 3, the customer whether a deployed military service member or a customer experiencing a financial hardship may suspend both his monthly principal and interest payment. The customer may complete an application to suspend his monthly principal and interest payment 310. The customer may choose for the suspension of the monthly principal and interest payment to occur immediately (if currently deployed or currently experiencing a financial hardship) or he may allow this suspension to remain dormant until it is needed 312. If the customer wants to implement this suspension immediately, it will be determined whether the interest on the original or the first loan amount will continue to accrue or whether the interest accrual will be suspended for the period of the suspension 320. The customer will discontinue making the monthly principal and interest payments 322 and borrow a predetermined amount of money only to cover his monthly escrow payments over the length of time that the monthly principal and interest payment are suspended 324. After the suspension of the monthly principal and interest payment is terminated at the end of a predetermined time (or earlier, if cancelled) 326, the customer will refinance the borrowed predetermined amount of money covering the monthly escrow in combination with the amount of the original or first loan on his home 326. Once the refinancing has taken place, the customer will begin to make monthly mortgage payments on the second loan amount 330.

For the customer that does not want the suspension of the monthly principal and interest payment to occur immediately, but at a later date 312, the customer must inform the financial institution that he wants to implement the suspension by indicating that he has been deployed or by indicating that he is experiencing a financial hardship 314. Alternatively, the financial institution may be notified by a government entity, such as the Department of Defense that the customer who is a military service member has been deployed. After this notification, the suspension of the monthly principal and interest payments may begin. In this embodiment, the customer may apply for the suspension at a banking branch, using an on-line application, using a PDA, using a telephone or a cellular phone or using a text message. The customer may notify the financial institution using these same methods that the suspension should begin. Once the notification is received, the suspension of the monthly principal and interest payments will begin 316.

Next, it will be determined whether the interest on the original or the first loan amount will continue to accrue or whether the interest accrual will be suspended for the period of the suspension 320. The customer will discontinue making the monthly principal and interest payments 322 and borrow a predetermined amount of money only to cover his monthly escrow payments over the length of time that the monthly principal and interest payment are suspended 324. After the suspension of the monthly principal and interest payments is terminated at the end of a predetermined amount of time (or earlier, if cancelled) 326, the original or first loan amount plus the predetermined amount borrowed to cover the monthly escrow payments made during the suspension will be combined into a new or second loan amount during a refinancing 328. The second loan amount is refinanced at an interest rate lower than the previous interest rate, if possible, i.e. the interest rate on the day that the reverse mortgage began or the interest rate on the day that the reverse mortgage terminates or ends. Once the refinancing has taken place, the customer will begin to make monthly mortgage payments on the second loan amount 330.

As described in the aforementioned embodiments, the amount of equity in the home subject to the suspension or the length of time of the suspension, for customers experiencing financial hardships, may depend on the emergency situation that has occurred, the amount of debt that the customer has, credit score, etc. Also, if the customer has obtained a significant amount of equity in his home not clearly reflected in his initial home appraisal, it may be necessary to adjust the amount of equity that the customer can access during the suspension. To reflect all of these occurrences and to determine the appropriate amount of equity subject to the suspension of the monthly principal and interest payment, it may be necessary to get a new appraisal on the home subject to the suspension or to pull a new credit report in order to access the customer's financial situation. The amount of equity subject to the suspension may be increased or decreased accordingly.

Description of Exemplary Computing and Network Environments

Figure 4:
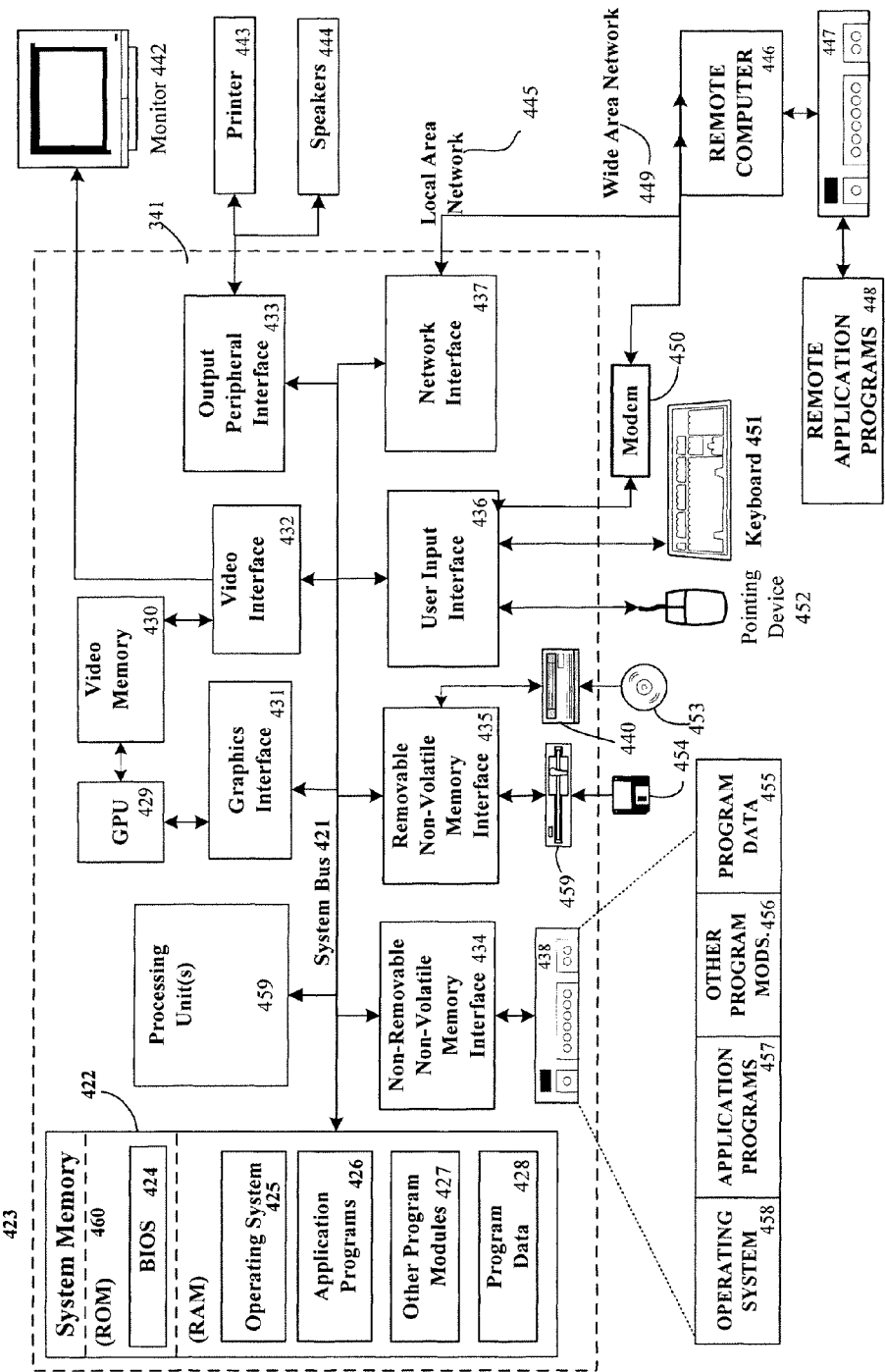
FIG. 4 is a block diagram representing an example computing device environment in which the illustrative embodiments may be employed.

Referring to FIG. 4, shown is a block diagram representing an exemplary computing device suitable for use in conjunction with implementing the systems and methods described above. For example, the computer executable instructions that carry out the processes and methods described herein may reside and/or be executed in such a computing environment as shown in FIG. 4. The computing system environment 420 is only one example of a suitable computing environment and is not intended to suggest any limitation as to the scope of use or functionality of the presently disclosed subject matter. Neither should the computing environment 420 be interpreted as having any dependency or requirement relating to any one or combination of components illustrated in the exemplary operating environment 420.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable customer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that performs particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 441. Components of computer 441 may include, but are not limited to, a processing unit 459, a system memory 422, and a system bus 421 that couples various system components including the system memory to the processing unit 459. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

Computer 441 typically includes a variety of computer readable media. Computer readable media can be any available media that can be accessed by computer 441 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 441. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted in FIG. 4 include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface or adapter 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates remote application programs 448 as residing on memory device 447. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD- ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, handheld devices, supercomputers, or computers integrated into other systems.

In light of the diverse computing environments that may be built according to the general framework provided in FIG. 4, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 5:
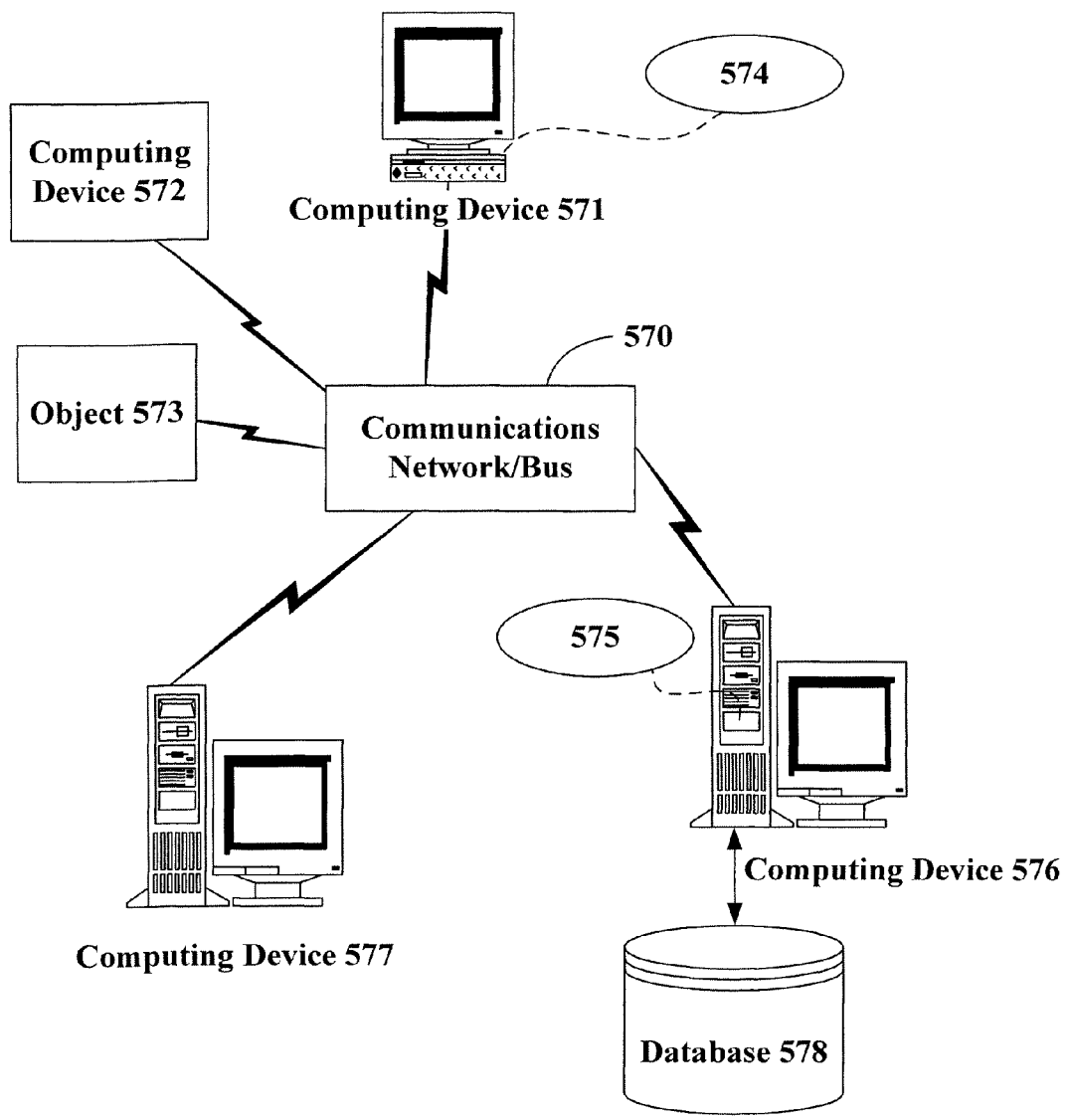
FIG. 5 is a block diagram representing an example networked computing environment in which the illustrative embodiments may be employed.

Referring next to FIG. 5, shown is an exemplary networked computing environment in which many computerized processes may be implemented to perform the processes described above. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 5 provides a schematic diagram of an exemplary networked or distributed computing environment. The environment comprises computing devices 571, 572, 576, and 577 as well as objects 573, 574, and 575, and database 578. Each of these entities 571, 572, 573, 574, 575, 576, 577, and 578 may comprise or make use of programs, methods, data stores, programmable logic, etc. The entities 571, 572, 573, 574, 575, 576, 577, and 578 may span portions of the same or different devices such as PDAs, audio/video devices, MP3 players, personal computers, etc. Each entity 571, 572, 573, 574, 575, 576, 577, and 578 can communicate with another entity 571, 572, 573, 574, 575, 576, 577, and 578 by way of the communications network 570. In this regard, any entity may be responsible for the maintenance and updating of a database 578 or other storage element.

This network 570 may itself comprise other computing entities that provide services to the system of FIG. 5, and may itself represent multiple interconnected networks. In accordance with an aspect of the presently disclosed subject matter, each entity 571, 572, 573, 574, 575, 576, 577, and 578 may contain discrete functional program modules that might make use of an API, or other object, software, firmware and/or hardware, to request services of one or more of the other entities 571, 572, 573, 574, 575, 576, 577, and 578.

It can also be appreciated that an object, such as 575, may be hosted on another computing device 576. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 5, any entity 571, 572, 573, 574, 575, 576, 577, and 578 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other.

The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 5 and the further diversification that can occur in computing in a network environment such as that of FIG. 5, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

As mentioned above, while exemplary embodiments of the invention have been described in connection with various computing devices, the underlying concepts may be applied to any computing device or system. Thus, the methods and systems of the present invention may be applied to a variety of applications and devices. While exemplary names and examples are chosen herein as representative of various choices, these names and examples are not intended to be limiting. One of ordinary skill in the art will appreciate that there are numerous ways of providing hardware and software implementations that achieves the same, similar or equivalent systems and methods achieved by the invention.

As is apparent from the above, all or portions of the various systems, methods, and aspects of the present invention may be embodied in hardware, software, or a combination of both.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A computer-implemented method of providing a mortgage reversal option for a military service member, the method comprising: providing, on a computing system, an application for a mortgage, including a deployment mortgage reversal option, to a military service member; receiving, on the computing system, a completed application including the deployment mortgage reversal option; receiving, on the computing system, a first electronic communication comprising a deployment notification regarding deployment of the mortgage-holding military service member; suspending, with the computing system, a payment of principal and interest on the mortgage upon receiving the first electronic communication comprising the deployment notification; distributing, with the computing system, funds to a family member of the mortgage-holding military service member during deployment of the military service member, the funds being distributed from the deployment mortgage reversal option; continuing to pay, with the computing system, funds to an escrow of the mortgage; and automatically terminating, with the computing system, the deployment mortgage reversal option based on a termination of the deployment of the military service member.

2. The method of claim 1, including suspending an accrual of interest on the mortgage during deployment of the mortgage-holding military service member.

3. The method of claim 1, wherein providing the application on the computing system comprises at least one of providing the application on a banking branch computer, online on a webpage, on a personal data assistant, on a telephone, on a cellular phone, or in a text message.

4. The method of claim 1, further comprising:
adjusting the amount of equity in a home owned subject to the deployment mortgage reversal option based on at least one of: a new home appraisal, a credit report, or an economic hardship; and
suspending an interest accrual on a mortgage subject to the deployment mortgage reversal option.

5. The method of claim 1, further comprising implementing the deployment mortgage reversal option during at least one of:
a deployment of the military service member; and
a financial hardship of the military service member.

6. The method of claim 1, further comprising adjusting the amount of equity in a home subject to the deployment mortgage reversal option based on at least one of a deployment in a war zone, a deployment in a foreign country not a war zone, and a number of times the deployment mortgage reversal option has been used.

7. The method of claim 1, further comprising receiving a second electronic communication comprising a notification that the military service member is no longer deployed, and, responsive to receiving the second electronic communications, terminating the deployment mortgage reversal option.

8. A system comprising:
a processor;
a memory storing computer-readable instructions for providing a mortgage reversal option for a military member, the computer-readable instructions executable by the processor to:
provide an application for a deployment mortgage reversal option in a mortgage to a military service member;
receive on the computing system a completed application for the mortgage with the deployment mortgage reversal option;
receive a first electronic communication comprising a deployment notification regarding deployment of the mortgage-holding military service member;
suspend a payment of principal and interest on the mortgage upon receipt of the first electronic communication comprising the deployment notification;
distribute funds to a family member of the mortgage-holding military service member during deployment of the military service member, the funds being distributed from the deployment mortgage reversal option;
continue to pay funds to an escrow of the mortgage; and
automatically terminate the deployment mortgage reversal option based on a termination of the deployment of the military service member.

9. The system of claim 8, further comprising computer-readable instructions executable by the processor to suspend an accrual of interest on the mortgage during deployment of the mortgage-holding military service member.

10. The system of claim 8, further comprising computer-readable instructions executable by the processor to provide the application on at least one of a banking branch computer, a webpage accessible online, an application accessible on a personal data assistant, an application accessible on a telephone, an application accessible on a cellular phone, or an application accessible on a text message.

11. The system of claim 8, further comprising computer-readable instructions executable by the processor to:
- adjust the amount of equity in a home owned subject to the deployment mortgage reversal option based on at least one of: a new home appraisal, a credit report, or an economic hardship; and
- suspend an interest accrual on a mortgage subject to the deployment mortgage reversal option.

12. The system of claim 8, further comprising computer-readable instructions executable by the processor to implement the deployment mortgage reversal option during at least one of:
- a deployment of the military service member; and
- a financial hardship of the military service member.

13. The system of claim 8, further comprising computer-readable instructions executable by the processor to adjust the amount of equity in a home subject to the deployment mortgage reversal option based on at least one of a deployment in a war zone, a deployment in a foreign country not a war zone, and a number of times the deployment mortgage reversal option has been used.

14. The system of claim 8, further comprising computer-readable instructions executable by the processor to receive a second electronic communication comprising a notification that the military service member is no longer deployed, and, responsive to receiving the second electronic communications, terminating the deployment mortgage reversal option.

15. A non-transitory computer-readable medium comprising computer-readable instructions for providing a mortgage reversal option for a military service member, the computer-readable medium comprising computer-readable instructions to:
- provide an application for a deployment mortgage reversal option in a mortgage to a military service member;
- receive a completed application for a deployment mortgage reversal option;
- receive a first electronic communication comprising a deployment notification regarding deployment of the mortgage-holding military service member;
- suspend a payment of principal and interest on the mortgage upon receiving the first electronic communication comprising the deployment notification;
- distribute funds to a family member of the mortgage-holding military service member during deployment of the military service member, the funds being distributed from the deployment mortgage reversal option;
- continue to pay funds to an escrow of the mortgage; and
- automatically terminate the deployment mortgage reversal option based on a termination of the deployment of the military service member.

16. The non-transitory computer-readable medium of claim 15, where the computer-readable instructions suspend an accrual of interest on the mortgage during deployment of the mortgage-holding military service member.

17. The non-transitory computer-readable medium of claim 16, wherein the computer-readable instructions to provide the application comprise computer-readable instructions to provide the application on at least one of a banking branch computer, online on a web page, on a personal data assistant, on a telephone, on a cellular phone, or in a text message.

18. The non-transitory computer-readable medium of claim 15, further comprising computer-readable instructions to:
- adjust the amount of equity in a home owned subject to the deployment mortgage reversal option based on at least one of: a new home appraisal, a credit report, or an economic hardship; and
- suspend an interest accrual on a mortgage subject to the deployment mortgage reversal option.

19. The non-transitory computer-readable medium of claim 15, further comprising computer-readable instructions to implement the deployment mortgage reversal option during at least one of:
- a deployment of the military service member; and
- a financial hardship of the military service member.

20. The non-transitory computer-readable medium of claim 15, further comprising computer-readable instructions to adjust the amount of equity in a home subject to the deployment mortgage reversal option based on at least one of a deployment in a war zone, a deployment in a foreign country not a war zone, and a number of times the deployment mortgage reversal option has been used.

21. The non-transitory computer-readable medium of claim 15, further comprising computer-readable instructions to electronic communication comprising a notification that the military service member is no longer deployed, and, responsive to receiving the second electronic communications, terminate the deployment mortgage reversal option.

* * * * *